United States Patent
Paradies et al.

(10) Patent No.: US 10,503,781 B2
(45) Date of Patent: Dec. 10, 2019

(54) EXTENDING GRAPH TRAVERSALS WITH APPLICATION LOGIC

(71) Applicant: SAP SE, Walldorf (DE)

(72) Inventors: Marcus Paradies, Walldorf (DE); Wolfgang Lehner, Dresden (DE); Michael Rudolf, Heidelberg (DE)

(73) Assignee: SAP SE, Walldorf (DE)

( * ) Notice: Subject to any disclaimer, the term of this patent is extended or adjusted under 35 U.S.C. 154(b) by 681 days.

(21) Appl. No.: 14/820,357

(22) Filed: Aug. 6, 2015

(65) Prior Publication Data
US 2016/0306896 A1 Oct. 20, 2016

Related U.S. Application Data

(60) Provisional application No. 62/147,170, filed on Apr. 14, 2015.

(51) Int. Cl.
*G06F 16/00* (2019.01)
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
CPC ........ G06F 17/30958; G06F 17/30979; G06F 16/9024; G06F 16/90335
USPC .......................................................... 707/737
See application file for complete search history.

(56) References Cited

U.S. PATENT DOCUMENTS

| | | | | |
|---|---|---|---|---|
| 8,234,310 B2* | 7/2012 | Pottenger | ............... | G06Q 10/10 707/802 |
| 8,321,430 B2* | 11/2012 | Zvi | .................. | G06F 17/30368 707/754 |
| 8,688,729 B2* | 4/2014 | Gagliardi | ............ | G06F 11/3612 707/769 |
| 2008/0162207 A1* | 7/2008 | Gross | ........................ | G06F 8/35 703/2 |
| 2010/0262574 A1* | 10/2010 | Zhou | ........................ | G06N 5/02 706/50 |
| 2011/0082892 A1* | 4/2011 | Ogasawara | ............. | G06F 9/526 707/819 |
| 2012/0096394 A1* | 4/2012 | Balko | ................... | G06F 3/0482 715/790 |
| 2013/0073858 A1* | 3/2013 | Lim | ..................... | G06F 21/6218 713/176 |
| 2014/0172810 A1* | 6/2014 | Paradies | ........... | G06F 17/30315 707/705 |

(Continued)

OTHER PUBLICATIONS

Bornhövd et al., "Graphite: An Extensible Graph Traversal Framework for Relational Database Management Systems", https://pdfs.semanticscholar.org, 12 pages, Dec. 19, 2014.*

(Continued)

*Primary Examiner* — Monica M Pyo
(74) *Attorney, Agent, or Firm* — Mintz, Levin, Cohn, Ferris, Glovsky and Popeo, P.C.

(57) ABSTRACT

Traversal hooks are based on an event-oriented programming model and provide an expressive mechanism to extend a graph traversal operator with domain-specific coding. A traversal operator can visit (i.e., traversal events) vertices and edges of a graph in an ordered manner. Related apparatus, systems, techniques and articles are also described.

20 Claims, 15 Drawing Sheets

(56) References Cited

U.S. PATENT DOCUMENTS

2014/0380283 A1* 12/2014 Hu .................. G06F 11/3604
717/132
2015/0370919 A1* 12/2015 Bornhoevd ....... G06F 17/30958
707/798

OTHER PUBLICATIONS

Lattner et al. "LLVM: A compilation Framework for Lifelong Program Analyssi & Transformation", CGO '04, 12 pages, 2004.*
Rehme, "An Internal Represenation for Adaptive Online Parallelization", Department of Electrical and Computer Engineering, Brigham Young University, 122 pages, Aug. 2009.*
Rudolf et al.; "The Graph Story of the SAP HANA Database"; https://www.semanticscholar.org/paper/The-Graph-Story-of-the-SAP-HANA-Database-Rudolf-Paradies/4b573416043cf9cff42cbb7b753993c907a2be4a ; 18 pages; 2013.*

* cited by examiner

```
Listing 2: Basic structure of a Travel script.
1  // Preamble section
2  DECLARE ...
3
4  // Hook section
5  HOOK EDGE "H1" { ... }
6  HOOK EDGE "H2" { ... }
7  HOOK VERTEX "H3" { ... }
8
9  // Traversal section
10 TRAVEL { ... }
```

| Operation | Travel | Return Type |
|---|---|---|
| Attribute Access | $i@weight | Plain value |
| Vertex Neighborhood | $i --> | Set of vertices |
| Edge Neighborhood | $i-?-> | Set of edges |
| Edge constructor | EDGE($v,$u) | Edge object |
| Head vertex access | HEAD($e) | Vertex object |
| Tail vertex access | TAIL($e) | Vertex object |

500

```
1  DECLARE TRANSIENT VERTEX ATTRIBUTE<INT> qnty;
2
3  HOOK VERTEX "V" (CONTEXT $c) {
4      UPDATE $c { SET qnty = 2; }
5  }
6
7  HOOK EDGE "E" (CONTEXT $c) {
8      $s = HEAD($c); $t = TAIL($c);
9      UPDATE $c { SET weight = $t@qnty + [$s@qnty]; }
10 }
```

702 points to `SET qnty`
704 points to `$s@qnty;`

FIG. 7

```
1  DECLARE TRANSIENT
2      VERTEX ATTRIBUTE<double> sigma, delta;
3  DECLARE TRANSIENT
4      VERTEX ATTRIBUTE<double> bc = 0.0;
5
6  HOOK VERTEX "FORW" (CONTEXT $c) {
7      @parents = $c<--;
8      $sum = 0.0;
9      FOR $i : @parents {
10         $sum += $i@sigma;
11     }
12     UPDATE $c { SET sigma = $sum; }
13 }
14
15 HOOK VERTEX "BACK" (CONTEXT $c) {
16     @children = $c-->;
17     $sum = 0.0;
18     FOR $i : @children {
19         $sum += $c@sigma / $i@sigma * (1+$i@delta);
20     }
21     UPDATE $c { SET delta = $sum;
22                 SET bc = bc + $c@delta; }
23 }
24
25 TRAVEL {
26     FOREACH $v : @VERTICES {
27         UPDATE $v { SET sigma = 1.0; }
28         TRAVERSE BFS $v-->(*) WITH HOOK "FORW";
29         TRAVERSE BFS $v<--(*) WITH HOOK "BACK";
30     }
31 }
```

*FIG. 9*

```
1  DECLARE TRANSIENT
2    VERTEX ATTRIBUTE<int> dist = INF;
3  DECLARE TRANSIENT
4    VERTEX ATTRIBUTE<vertexid> prev;
5  DECLARE PRIORITY_QUEUE<vertex,int> q;
6
7  HOOK EDGE "DIJKSTRA" (CONTEXT $c) {
8    $alt = HEAD($e)@dist + $e@weight;
9    IF ($val < HEAD($e)@dist) {
10     UPDATE TAIL($c) { SET dist = $alt, SET prev =
            $c; }
11     q.decrease_priority(TAIL($c), $alt);
12   }
13 }
14
15 TRAVEL {
16   $root = { vertex:root };
17   UPDATE $root { SET dist = 0; }
18   WHILE NOT(q.empty()) {
19     $v = q.extract_min();
20     TRAVERSE BFS $v--> WITH HOOK "DIJKSTRA";
21   }
22 }
```

*FIG. 10*

```
 1  DECLARE TRANSIENT VERTEX ATTRIBUTE<int> pop = 0;
 2
 3  HOOK VERTEX "RECOMMEND" (CONTEXT $v) {
 4    $candidates = $v-[@type=likes]->;
 5    for $i : $candidates
 6      UPDATE $i { SET pop = pop + 1; };
 7  }
 8
 9  TRAVEL {
10    $user = { vertex:029182 };
11    $liked = $user-[@type=likes]->;
12    TRAVERSE BFS $liked<-[@type=likes]-
13      WITH HOOK "RECOMMEND";
14    RETURN ($VERTICES - $liked)
15    ORDER DESC BY @pop
16    TOP 10;
17  }
```

*FIG. 12*

```
 1  // Earliest possible start schedule
 2  DECLARE TRANSIENT
 3      VERTEX ATTRIBUTE<int> earliest = 0;
 4  // Latest possible start schedule
 5  DECLARE TRANSIENT
 6      VERTEX ATTRIBUTE<int> latest = 0;
 7  // Output structure
 8  DECLARE LIST<VERTEX> myRes;
 9
10
11  HOOK VERTEX "FORWARD" (CONTEXT $v) {
12      $predecessors = $v<--;
13      $max = 0; $predecessors {
14      @e = EDGE($i,$v);
15      if (($e@duration + $i@earliest) > $max)
16          $max = $e@duration + $i@earliest;
17      }
18      UPDATE $v { SET earliest = $max; }
19  }
20  HOOK VERTEX "BACKWARD" (CONTEXT $v) {
21      $successors = $v-->;
22      $min = INT_MAX;
23      FOR $i : $successors {
24      @e = EDGE($i,$v);
25      if (($i@latest - $e@duration) < $min)
26          $min = $i@latest - $e@duration;
27      }
28      UPDATE $v { SET latest = $min; }
29  }
30  HOOK VERTEX "CRIT_PATH" (CONTEXT $v) {
31      if (($v@earliest == $v@latest)
32          myRes.append($v);
33      }
34  }
35  TRAVEL {
36      $root = { vertex:ST };
37      $tail = { vertex:FI };
38      TRAVERSE BFS $root -->(*) WITH HOOK "FORWARD";
39      TRAVERSE BFS $tail -->(*) WITH HOOK "BACKWARD";
40      TRAVERSE BFS $root -->(*) WITH HOOK "CRIT_PATH";
41  }
```

EXTENDING GRAPH TRAVERSALS WITH APPLICATION LOGIC

CROSS REFERENCE TO RELATED APPLICATIONS

This application claims priority to and the benefit of U.S. Provisional Patent Application No. 62/147,170 filed on Apr. 14, 2015, titled Extending Graph Traversals with Application Logic, which is hereby incorporated by reference in its entirety.

TECHNICAL FIELD

The subject matter described herein relates to the use of application logic to extend graph traversals.

BACKGROUND

Increasingly, large companies face the challenge of storing, manipulating, and querying terabytes of graph-structured data for enterprise-critical applications. To cope with efficient graph data management at scale, a plethora of graph processing systems and algorithms has been proposed. These solutions, however, are typically ill-suited for online querying in business applications because they can aggravate system landscape integration and do not offer typical database features, such as transactional support and query optimization at run-time. Even worse, graph algorithms show a tremendous variety in structure and expressiveness caused by their domain-specific implementation and therefore can only be integrated into a database management system using custom coding.

SUMMARY

In one aspect of the current subject traversal hooks can be provided as a programming model to implement traversal-based algorithms. The traversal-based algorithms can be introduced on top of built-in default traversal implementations. In some variations, TraveL (a domain-specific language introduced herein) can be used to describe traversal-based algorithms. By generating code for TraveL queries at run time for a set of real-world applications, a query performance can be achieved that is comparable to native coding while providing a user-friendly query language and a simplified system landscape.

In one aspect, the current subject describes a method having operations implemented by at least one programmable processor. The at least one programmable processor can form at least one computing device. The operations can include receiving, by the at least one programmable processor, a query of a set of graph data. The query can include one or more conditions for assessing the set of graph data that causes the graph data to be traversed. The set of graph data can include a plurality of vertices and a plurality of edges between pairs of vertices.

The operations can include generating, using the at least one programmable processor, an intermediate machine-readable code. The intermediate machine-readable code can include instructions for executing one or more traversal operators for traversing the set of graph data. The intermediate machine-readable code generated by the at least one programmable processor can include interwoven instructions for executing one or more traversal hooks.

The operations can include identifying, using the at least one programmable processor, traversal hooks of the one or more of traversal hooks that can be independently executed. The operations can include grouping those identified independently executable traversal hooks that are capable of being processed in parallel. The intermediate machine-readable code can be compiled with the groups of traversal hooks to generate executable graph data traversal code for use during processing of the query. In some variations, compiling of the groups of traversal hooks can be performed by a just-in-time compiler.

Another aspect of the current subject matter relates to a system comprising at least one programmable processor configured by machine-readable instructions to perform the operations described herein. A further aspect of the current subject matter relates to a computer-readable medium configured to cause at least one programmable processor to perform the operations described herein.

In some variations, a traversal event can be detected that is associated with a traversal hook. Executable graph data traversal code can be identified that is associated with the traversal hook, which in turn is associated with the traversal hook. The executable graph data traversal code associated with the traversal hook can be executed.

The traversal hooks can be event-based. The traversal hooks can comprise traversal operators configured to visit vertices and edges of the graph data in an ordered manner. The traversal operations can be configured to identify a vertex and/or edge that has previously been visited during processing of the query. A traversal event can include the identification of a vertex and/or edge of the graph data having a core-defined status during a traversal of the graph data.

Traversal scripts can include a user-defined output. The traversal script can include an instruction to abandon a traversal of the graph data in response to the occurrence of a predefined condition.

Non-transitory computer program products (i.e., physically embodied computer program products) are also described that store instructions, which—when executed by one or more data processors of one or more computing systems—causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is an illustration of a listing having one or more elements consistent with the current subject matter;

FIG. 9 is an illustration of a listing for computing the betweenness centrality in TraveL, having one or more elements consistent with the current subject matter;

FIG. 10 is a diagram illustrating a listing for traversing the shortest path from one vertex to another vertex, having one or more elements consistent with the current subject matter;

FIG. 12 is a diagram illustrating a TraveL query describing the collaborative filtering illustrated in FIG. 11, having one or more elements consistent with the current subject matter;

FIG. 13 is an illustration of a query, have one or more elements consistent with the current subject matter;

DETAILED DESCRIPTION

Figures 1A, 1B, 1C:
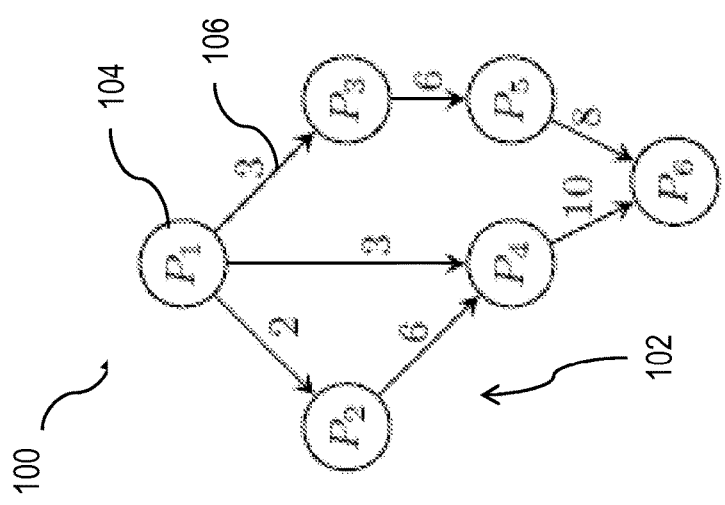
FIG. 1A is a diagram illustrating graph data having one or more elements consistent with the current subject matter.
FIG. 1B is an illustration of a listing summarizing a traversal of the graph data illustrated in FIG. 1A, the traversal having one or more elements consistent with the current subject matter.
FIG. 1C is a table summarizing the result of traversing the graph data illustrated in FIG. 1A, having one or more elements consistent with the current subject matter.

The abundance and diversity of massive-scale graph-structured data and the ever-growing interest of large companies to analyze them are the key drivers of the recent advances in graph data management research. FIG. 1A is an illustration 100 of a graph data structure 102 having one or more elements consistent with the current subject matter. A graph data structure 102 typically consists of a finite, although mutable, set of nodes 104 and edges 106. There can be multiple edges 106 between the same pair of nodes 104. One or more edges 106 between a pair of nodes 104 can be direction or non-directional. Directional edges 106 limit traversal between nodes to a particular direction. Non-directional edges 106 permit traversal between nodes in any direction.

Node and edge attributes can be stored with the graph data structure in electronic storage associated with the graph data structure 102. Node and edge attributes can be stored logically and/or physically separate from the graph data structure 102. A graph data structure 102 can associate with each edge an edge value. For example the ordered pair of nodes 104 of $P_1$ and $P_2$ has an edge value of 2. The edge value can be a symbolic label or a numerical attribute. Examples of numerical attributes are cost, capacity, and length. In some variations, edge values and/or vertex values can be provided in any data type. For example, spatial data types, string data types, matrix data types and other data types. In some variations, vertices can be stored as records or objects. The record associated with each vertex can store a list of adjacent vertices.

There are many distributed graph processing systems. Many of the distributed graph processing systems are tailored to different use case scenarios and programming models. Efficient graph algorithms exist for domain-specific scenarios. Such scenarios include graph traversals. Graph traversals are fundamental and important building blocks for large-scale graph processing.

Higher-level operations on graph data structures include finding the path between two nodes, finding the shortest path between two nodes, finding the shortest path from a given node to every other node in the graph data structure, and other higher-level operations.

Graph traversal can include visiting each node in a graph data structure in a particular manner. Values of nodes and/or edges can be updated and/or checked during a graph traversal. Graph traversal can include visiting a single node more than once. In some circumstances it is not necessarily known before transitioning to a node that it has already been explored. The denser the graph, the more prevalent this type of redundancy becomes, making graph traversal less efficient. Consequently, the time taken to traverse a graph is not necessarily a linear function of the number of nodes in the graph data structure.

Graph traversal systems can be configured to remember which nodes have already been explored during a graph traversal. This facilitates a reduction in the revisiting of nodes during a graph traversal. Nodes can be assigned a color or a state to signify that it has been examined during the graph traversal. Consequently, the graph data system can identify that a node has already been examined when the node is visited. When a node on a particular traversal path has already been visited a traversal algorithm can be configured to stop pursuing that traversal path.

In some cases, the condition of one node as having already been visited can indicate that other nodes have been visited as well. Such cases include a tree of nodes. A tree of nodes consists of one parent node, or root node, having multiple branches extending from it. Those branches would not include nodes having vertices that extend to nodes not on the tree. Consequently, after the first examination of a root node, a subsequent pass of that node would indicate that all nodes in the tree have been examined.

Edges can be directional. An edge can be configured to allow traversal from a first node to a second node, such as between node $P_1$ to $P_2$ in FIG. 1A. An edge can be non-directional. The edge can be configured such that it provides no restriction to the direction of traversal between a pair of nodes.

General graph data traversal algorithms exist to facilitate traversal through a graph data structure. One of these general traversal algorithms is a depth-first search (DFS). Another of these general traversal algorithms is a breadth-first search (BFS). A DFS algorithm is one for traversing a finite graph. DFS can generally visit child nodes of a start node before visiting sibling nodes of the start node. For example, in FIG. 1, nodes $P_2$, $P_3$, and $P_4$ are all sibling nodes. In a DFS, $P_4$ would be visited after $P_2$, but before $P_3$, because $P_4$ is the child of $P_2$. Once the DFS algorithm visits a node in a tree from which it cannot continue it will visit a sibling node of the original root node and examine the sibling node's tree. BFS, on the other hand, visits parent nodes before visiting child nodes. A queue can be used in the search process. BFS can be used to find the shortest path between two nodes that are not directly connected to each other, but are indirectly connected through one or more other nodes.

Graph applications are typically domain-specific and model complex business processes in property graphs. To write domain-specific graph algorithms, simple graph traversals are not expressive enough nor do they allow customization to the user's needs. For example, a summarized bill-of-materials (BOM) explosion requires traversing a parts hierarchy and also requires an accumulation of part quantities to form the final result containing all subparts and their quantities. Standard traversal algorithms are limited in extensibility and provide only a fixed traversal semantic. A repeated visit of specific vertices or a data-dependent traversal restriction to certain paths is not possible.

User-defined graph algorithms can be provided to facilitate graph data traversal. However, procedural programming interfaces are cumbersome to use and require the user to specify the graph algorithm against a low-level graph API in a general-purpose language, such as C++ or JAVA. When the user code runs in the same operating system process as the database, software bugs or misuse of available resources can pose the danger of harming the database system stability significantly and greatly reduce the efficiency of the traversal. If the user code runs in a separate process, the algorithm might suffer from network communication delays between client and server process. To the worse, writing graph algorithms in a general-purpose language prevents exploiting data-dependent and domain-dependent optimizations at run time and certain query optimization and rewriting techniques, such as filter push-down and exploiting intra-query parallelism, cannot be exploited.

Traversal hooks can extend and manipulate graph traversal implementations. They can be customized by the user and can be implemented to traverse graph data efficiently and without the risk of damaging the database system. Traversal hooks follow an event-based programming model. They can provide an interface for a variety of traversal events. A traversal event can include the discovery of a new edge or the visit of an already discovered vertex. Traversal hooks can be configured to only react to query operations. BFS and DFS graph traversal strategies can be combined with traversal hooks. Traversal hooks can be expressed in a high-level domain-specific language, for example TraveL. A framework, such as LLVM, can be used to glue together the traversal code with the traversal hooks. The traversal code and the traversal hooks can be combined at run time to generate efficient user-defined traversal operators. In some variations, static program analysis can be leveraged to rewrite and optimally embed the traversal hooks into traversal operators and compile them for later use.

Code that can efficiently analyze data can be generated from traversal hooks. The code can be optimized. Optimization can be facilitated with static program analysis of scripts.

Traversal hooks can be evaluated based on a series of real-world applications.

With Reference to FIG. 1A.

Query support for bill-of-materials (BOM) applications is a common requirement in business environments. A BOM hierarchy can be represented as an acyclic, single-rooted graph. The single-rooted graph can have a root node $P_1$. The graph can describe the relationships between parts codes ($P_1$ to $P_6$). Each edge can have an attribute quantity. The attribute quantity can describe how many instances of the subpart, represented by nodes, are required to manufacture the overall part. Traversal hooks can be used to answer the question of "what is the total quantity of each part required to build part $P_1$?"

In some variations a domain-specific language can be implemented for graph data traversal. An example of a domain-specific language can include TraveL. A TraveL script can consist of an optional preamble, followed by a set of traversal hook definitions. FIG. 1B is an illustration of a listing 108 summarizing a traversal of the graph data illustrated in FIG. 1A, the traversal having one or more elements consistent with the current subject matter. Listing 108 depicts an example for the summarized BOM explosion. In this example a transient vertex attribute qnty of type int can be used to collect intermediate results and initialize all values to zero, except for the root vertex code $P_1$. For this example, a traversal hook can be defined to react to a traversal event. A traversal event can include a newly discovered edge. For each traversal hook call, the head and tail vertex can be extracted from the context and stored in two temporary variables. The transient vertex attribute qnty can be updated with the sum of the qnty of the tail vertex and the multiplication of the edge weight code quantity and the vertex attribute qnty of the head vertex codes. FIG. 1C is a table 110 summarizing the final result of the summarized BOM explosion starting from root vertex $P_1$.

Traversal hooks can be based on an event-oriented programming model. Traversal hooks can provide an expressive mechanism to extend a graph traversal operator with domain-specific coding. A traversal operator can visit vertices and edges of a graph in an ordered manner. Visiting vertices and edges of a graph can be traversal events.

Further examples for traversal events can include the discovery, or initial visit of a vertex or edge or the repeated visit of a vertex or edge. Each traversal event can trigger an immediate execution of a set of user-defined operations assigned to that particular event or event-type. Each user-defined operation can produce a persistent or volatile state. Traversal hooks facilitate writing an output to a result structure. Traversal hooks allow the manipulation of the traversal control flow through the graph data.

Figure 2:
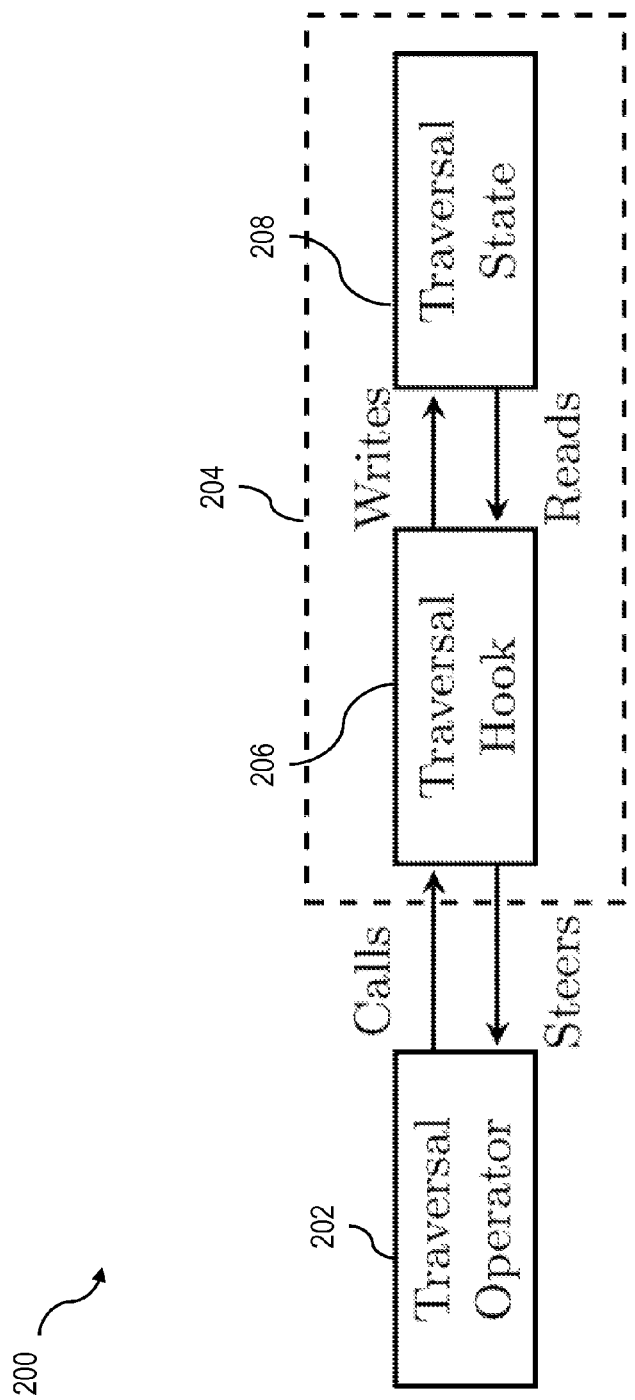
FIG. 2 is a diagram illustrating interaction between a traversal operation and a scripting extension having one or more elements consistent with the current subject matter.

FIG. 2 is a diagram 200 illustrating the interactions between a traversal operator 202 and the traversal scripting extensions 204 with its component traversal hook 206 and the traversal state 208. Multiple traversal hooks can be associated with a graph traversal operator. Each traversal hook can be assigned to a single traversal event class. A single traversal event class, however, can trigger the execution of multiple traversal hooks. Traversal hooks can either share the traversal state or have exclusive state that is only visible within the specific traversal hook. In each call, the traversal hook can read its traversal state and access the graph through a common graph programming interface.

A traversal event T(k) can describe the discovery of an item k in the graph during a graph traversal. An item k can include, for example, a vertex or an edge. The set of traversal events for a specific traversal operation can be partially ordered with respect to the order of discovery of an item k. The ordering of traversal events can depend on: (1) the traversal strategy; and/or, (2) the specific traversal implementation. BFS and DFS are examples of traversal strategies. Within a traversal strategy, implementation details can influence the traversal event ordering. Traversal event ordering can include the order of visits of vertices discovered on the same level in a BFS traversal. Traversal events can be assigned a traversal number t(k). Traversal events triggered by the visit of a vertex v can be ordered in increasing order according to their assigned traversal number t(v). For example, for any edge $e \in E$ denoted as a tuple (u,v) with u, $v \in V$ and $u \neq v$ the following implication holds: $t(u) \leq t(v) \Rightarrow T(u) \leq T(e) \leq T(v)$.

Figure 3:
FIG. 3 is a diagram illustrating partial ordering of traversal events from vertex $v_1$ for breadth-first and depth-first traversal.

FIG. 3 is a diagram of an illustration 300 depicting valid partial ordering of events from vertex v for BFS and DFS traversals. The illustration 300 depicts a traversal starting at vertex $v_1$. For a BFS traversal, vertex $v_1$ is first discovered, then edges $e_2$ and $e_3$ are traversed and so on. Whether edge $e_2$ or edge $e_3$ is first discovered can be implementation-specific. The partial ordering can be a direct translation of the assigned traversal number $t(v_i)$ for a vertex $v_i$ in increasing order.

A traversal hook can receive a traversal context with information about the vertex or edge triggering the event. In the basic case, the traversal hook only has access to the vertex or edge identifier. The vertex edge or identifier can be the minimal context for the traversal hook. The horizon of the context can be broadened if the traversal hook accesses also attribute values or topology information. The context is implicitly specified by the traversal hook implementation itself. Each read or write access to primary data becomes part of the traversal context. For example, if the traversal hook accesses an edge attribute weight, this attribute can be part of the traversal context. In some variations a traversal hook can only access the identifier of the vertex. In other variations a traversal hook can access the identifier of multiple vertices. In other variations, for a single vertex $v_1$, the incident edges including attributes as well as adjacent vertices and attributes can be accessed.

To compute and collect intermediate and final results, traversal hooks can be configured to allow sharing a state between single calls. Two concepts are hereby introduced to collect data during a traversal operation where traversal hooks are implemented. These concepts include graph snapshots and user-defined output.

A graph traversal operates on a data snapshot of the graph. Data modification operations can be performed in isolation of the traversal operator. Data modification operations can be configured such that they are not visible during the execution of the graph traversal.

By convention a traversal always operates on a snapshot of the data graph and all modifications performed during the traversal are not visible to the operator. The current subject matter allows, however, transient and persistent modifications of the data graph as part of a traversal operation. Supported modifications can include the insertion or deletion of vertices or edges and the insertion or manipulation of vertex or edge attributes. For example, a user might add a transient vertex attribute weight to accumulate vertex-specific intermediate results during the traversal. Modifications to the data graph can be persisted in an atomic operation at the end of the traversal.

Multiple output formats can be defined by the user. Predefined output formats can include collections of vertices or edges, paths, trees, graph formats and other output formats. User-defined output formats can be application-specific and can collect data in container objects. Data objects can include well-known data objects from the standard library, for example, lists, vectors, maps, and other data objects. Data objects can include user-defined data objects.

The traversal hook can be called by the traversal operator. The traversal hook can notify the traversal operator with traversal control flow signals. The traversal control flow can describe how the graph should be traversed. For example, a breadth-first traversal implementation traverses the graph in a breadth-first manner by visiting all neighbors of a specific vertex before exploring the next level of neighborhood. Further, each vertex is discovered on the shortest path (with respect to number of traversed edges) and each vertex or edge is visited only exactly once. A modified traversal semantic, modified by a traversal hook, might allow cycles to some extent. For example, cycles can be allowed by permitting the visit of a vertex or edge multiple times. A modified traversal semantic, amended by a traversal hook, can block the traversal from continuing from a specific vertex or edge. The traversal control flow can be modified by traversal hooks. A traversal hook can be configured to modify the traversal control flow to have different traversal semantics. The traversal hook can be configured to allow adjusting of the traversal semantics to the specific use case currently being executed. A control flow modification to the traversal can be specified on the traversal hook level and can use signals to notify the calling traversal operator about a changed traversal semantic, with the changed traversal semantic parameters. Two examples of control flow modification include traversal restriction and traversal extension.

A graph traversal can be constructed to discover every vertex only once and never visit an already discovered vertex again. A graph traversal can be configured so that each edge can be traversed at most once to discover its target vertex. Such a traversal semantic can allow terminating the traversal once all vertices have been discovered or no undiscovered vertices are reachable anymore. Sometimes a more lenient traversal semantic is desirable. Traversal hooks can be configured to allow manipulating the traversal such that vertices can be visited multiple times and edges can be used for traversals more than once. In some variations a dedicated termination criterion may need to be defined to cause the execution to terminate. An example of a termination criterion can include defining a state associated with the number of times a vertex has been visited and when a state is reached indicating that a vertex has been visited n times, the execution of the graph traversal will terminate.

A traversal restriction can be configured to disallow the continuation from a vertex or edge. A traversal expansion can be configured to allow visiting a vertex or edge multiple times.

A traversal hook can be configured to restrict the traversal algorithm. The restriction can cause the traversal algorithm to abandon the traversal along a certain path. Conceptually, in this example, the traversal hook notifies the running traversal to omit the vertex or edge at hand from expanding the traversal. If a vertex satisfies the restriction condition, the vertex is marked as visited and will not be considered for the next traversal iteration. If an edge satisfies the restriction condition, its target vertex, the vertex that would trigger the call to the corresponding traversal hook, is not considered for the execution of the traversal hook and not for the next iteration of the traversal.

Figure 4:
FIG. 4 is an illustration depicting a listing that includes an example of the basic structure of a TraveL script having one or more elements consistent with the current subject matter.

The domain-specific language TraveL is a graph query language that allows the formulation of traversal-based graph problems in a declarative and intuitive manner. In addition to declarative constructs, such as filter operations, path operations, and update operations, TraveL can be configured to support imperative programming constructs, such as conditional clauses and loops, to allow expressing a control flow in the query. A query written in TraveL can be divided into three parts: a preamble, a set of traversal hooks, and a traversal section. FIG. 4 is an illustration depicting a listing that includes an example of the basic structure of a TraveL script having one or more elements consistent with the current subject matter. The preamble of the TraveL query can include a set of declarations that are executed prior to the actual traversal query. The traversal hook section can contain a set of traversal hook statements, where each hook is a composite statement containing other declarative and imperative statements. The traversal section contains the actual query to run traversals with the registered traversal hooks, and to perform predicate evaluations on vertex/edge attributes.

The preamble can consist of a set of declaration statements to specify additional graph attributes. These attributes can be either vertex attributes or edge attributes. The attributes can be transient or persisted. Each attribute can be assigned a unique name that can be used throughout the script. The attribute name can be used to facilitate reading and writing of attribute values. TraveL can be configured to support multiple different data types. The data types can include String, Integer, Double, and other data types. An example of such a data type is where a transient vertex attribute is declared as being of type integer and initializes all its values to zero.

Traversal hooks can be configured to allow the user to create customized result structures. Examples of result structures include LIST and MAP result structures.

Data manipulation operations on vertex or edge attributes can be facilitated through update statements. Update statements can operate on either a single vertex or edge object or on a set of vertices or edges. A single update statement can comprise multiple set operations to update multiple attributes. Path extensions, conditional clauses, loops, and other operations can also be set.

Both traversal restriction and traversal expansion statements can use a Boolean expression to check whether the condition is satisfied or not. If the expression is evaluated to true, the traversal is either restricted or expanded.

Figure 5:
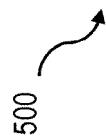
FIG. 5 includes a table that summarizes an example of supported basic graph operations, their corresponding syntax in TraveL, and the expected return type for a traversal hook having one or more elements consistent with the current subject matter.

Attributes and topology of the underlying data graph can be accessed. Access patterns can be exposed as native expressions in TraveL. FIG. 5 includes a table 500 that summarizes an example of supported basic graph operations, their corresponding syntax in TraveL, and the expected return type for a traversal hook having one or more elements consistent with the current subject matter.

Figure 6:
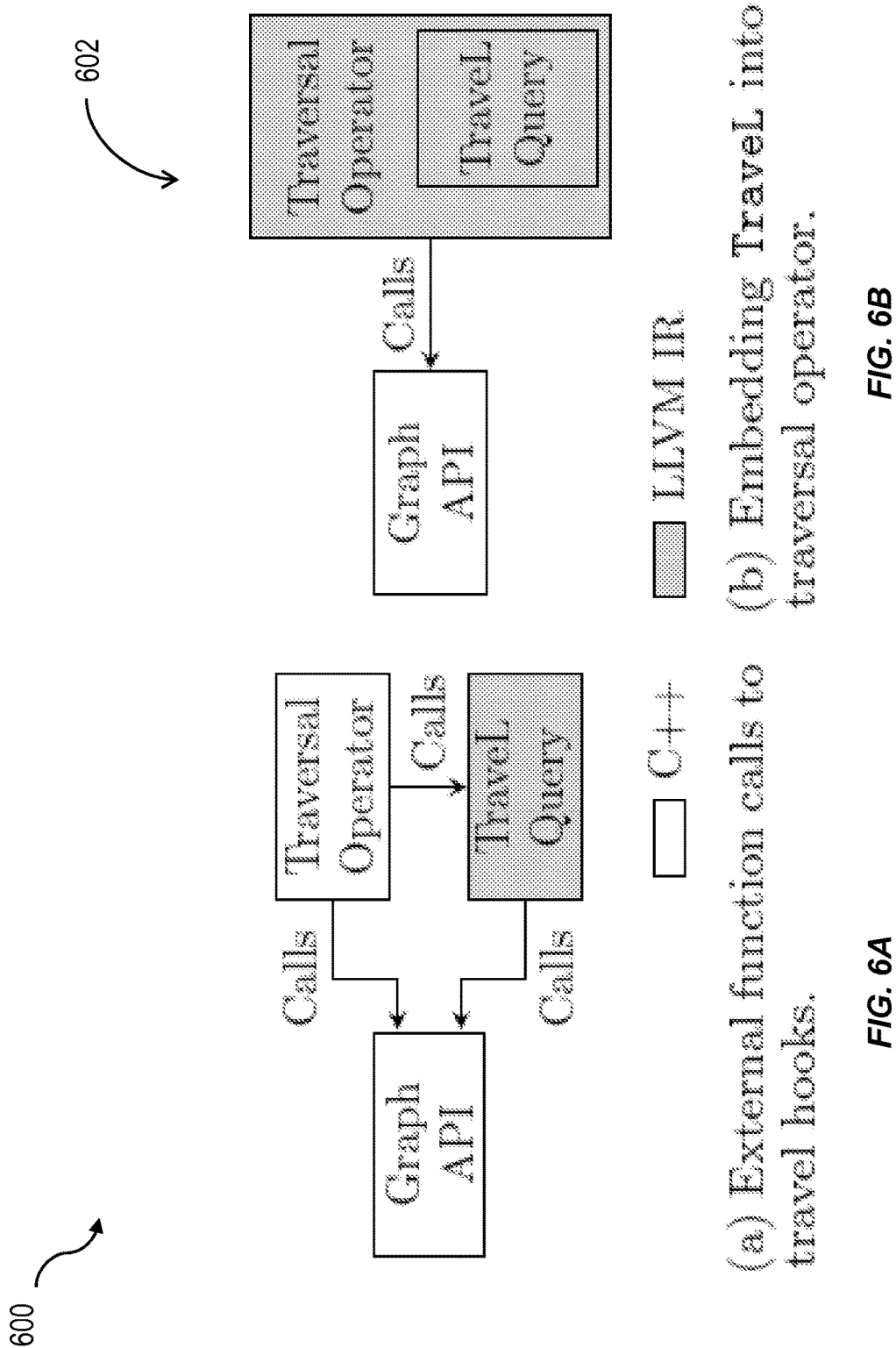
FIGS. 6A and 6B are diagrams illustrating code generation modes in TraveL, having one or more elements consistent with the current subject matter.

A compiler framework can be used to generate executable code from the traversal hook scripts. For example, an LLVM compiler framework can be used to generate executable code from TraveL scripts. FIGS. 6A and 6B include diagrams 600 and 602 illustrating code generation modes, having one or more elements consistent with the current subject matter. The diagrams 600 and 602 depict the steps from the input TraveL script to the execution of a query-specific traversal operator having one or more elements consistent with the current subject matter. In this example, a TraveL script can be read from a file or the command line, be parsed and then transformed into an abstract syntax tree. In the code generation phase, the abstract syntax tree can be traversed and an in-memory LLVM intermediate representation (LLVM IR) module can be generated. Static program analysis can be used to detect data dependencies between traversal hooks in the generated LLVM module. The data dependency analysis identifies traversal hook calls that can be executed independently from each other. The independence of traversal hook calls can allow reordering and grouping of single hook calls into bigger batch calls that can be further parallelized. Further, filter predicates can be analyzed that could be extracted from the traversal hook body and performed as a separate preprocessing step outside of the actual hook code. To generate executable code, the generated LLVM IR module can be passed to the just-in-time execution engine of the LLVM framework. Once compiled, the traversal hooks can be called from the traversal operator via a parameterized function pointer call. Finally, the compiled code unit can be cached in a query cache for later use.

To access graph data from the database, TraveL can use a low-level internal graph interface that offers basic graph functionality, such as access to vertex and edge attributes, retrieval of vertices connected to an edge, and the return of adjacent vertices for a given vertex. FIGS. 6A and 6B depict the relationships between the core components of the traversal operator, the graph API, and the traversal hooks.

An embedded approach can be used to facilitate the rewrite of not only traversal hooks, but also their calling code in the traversal operator. The code of the traversal operator and of the traversal hooks can be both specified in LLVM IR in the same module (see, for example, FIG. 6B).

The initial code generation approach can be configured to translate traversal hooks into machine code. The generated code of the traversal hooks and the traversal operator can form two different compilation units. Having two different compilation units can cause application issues for traditional code optimizations techniques, such as function inlining.

The provided code generation framework can be configured to generate code for the traversal operators and to interweave its intermediate representation with the generated code of the traversal hooks. Consequently, a single unit of compilation can be provided to the compiler, which can apply further code optimizations.

Traversal hooks can exhibit data dependencies either between calls of the same hook type or between different hook types. These data dependencies arise, when two traversal hook contexts overlap, and at least one write operation is involved.

Where $r(o, a_k)$ is a read operation on attribute $a_k$ for object $o \in V$ and where $w(o, a_k)$ is a write operation, respectively, then:

$$R_o = \{r(o, a_k) | 1 \leq k \leq n, o \in V \lor o \in E\}$$

$$W_o = \{w(o, a_k) | 1 \leq k \leq n, o \in V \lor o \in E\}$$

$$(R_o \cap W_o \neq \emptyset) \land t(v_i) \leq t(v_j)$$

$$W_{v_i} = \{|\}$$

$$R_{v_i} \cap W_{v_j} = \emptyset v_i, v_j \in V, v_i \neq v_j, t(v_i) \leq t(v_j)$$

$$w(v_i, a_k) = r(v_i, a_k) \text{ with } T$$

FIG. 7 is an illustration of a listing 700 having one or more elements consistent with the current subject matter. In listing 700 two traversal hooks are defined, one for vertices ("V") and one for edges ("E"), that share a read-after-write (RAW) data dependency on attribute qnty, between a write operation 702 and a read operation 704.

In the Listing 700, the attribute value qnty is modified (solid box) in traversal hook V and then afterwards read (dashed box) in traversal hook E.

Libraries of operators can augment the graph traversal tool set. For example, the Boost Graph Library (BGL) can provide BFS or DFS Visitors with an event-based programming interface to fundamental graph traversal patterns, including breadth-first and depth-first traversals. The purpose of this visitor framework is to extend these traversal building blocks with domain-specific coding. The application developer can define a class with the visitor interface and pass an instance of the class to the traversal implementation.

Whenever an event is triggered, the user code defined for this specific event can be executed. Although flexible and extensible, it can require advanced knowledge of complex programming languages, generic programming languages and performance-oriented programming in general.

Various programming models can be used, for example, Vertex-centric, Edge-centric, Graph-centric and other programming models. Various graph query languages can be used, for example, Cypher, Gremlin (especially gremlin steps), and SPARQL and other graph query languages.

The following example is of a property graph G with a temporal attribute validity attached to all its edges. Temporal graphs have a validity interval for each vertex and edge.

A validity interval can be defined as a set of consecutive chronons. Since there is an inherent order, an interval U can be denoted as a pair consisting of its boundaries: (min(U), max(U)).

The overlap of two intervals U and W can be defined as the intersection of the sets of chronons and can be defined in terms of their boundaries. Let $O_{min}=\max\{\min(U), \min(W)\}$ be the largest lower interval boundary and $O_{max}=\min\{\max(U), \max(W)\}$ be the smallest upper interval boundary, then, $$U \cap W := \begin{cases} (O_{min}, O_{max}) & \text{if } O_{min} \leq O_{max} \\ \emptyset & \text{otherwise} \end{cases}$$

A temporal traversal visits vertices in the graph in a breadth-first manner and by taking the temporal dimension into account. The temporal traversal can also be limited to a query interval. The traversal outputs a set of reachable vertices and a minimal time interval they were reachable from the start vertex.

A vertex v is reachable if a path to it exists at any point in time during the query interval, which means that the intersection of all edge intervals and the query interval must not be empty.

Figure 8:
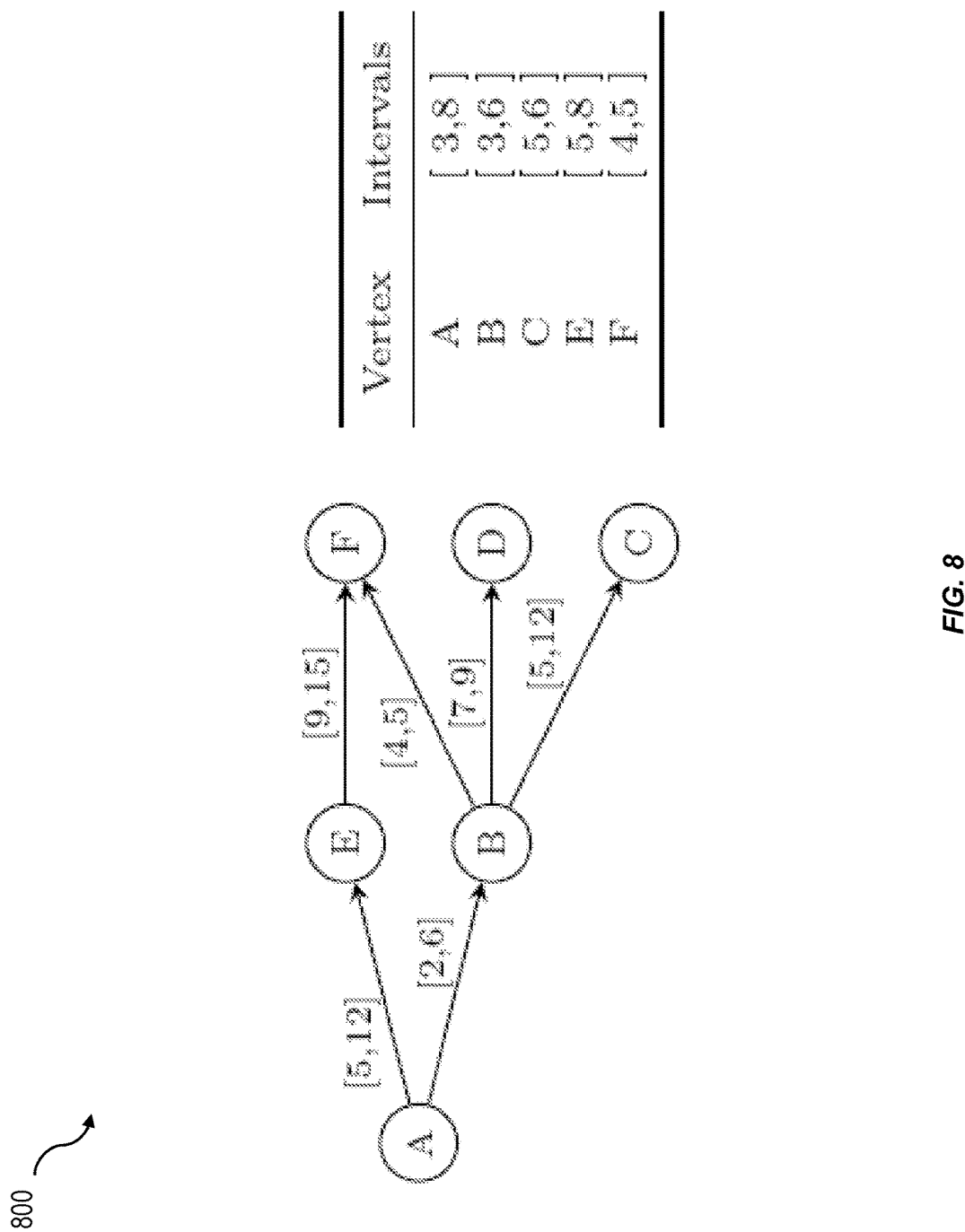
FIG. 8 is a diagram illustrating traversal on a graph with temporal edge attribute and result for query Q=(A, [3, 8]), the traversal hook having one or more elements consistent with the current subject matter.

FIG. 8 is an illustration 800 depicting a property graph with a temporal attribute attached to the edges. For query $Q=(S, I_q)$ with the start vertices $S=\{A\}$ and the query interval $I_q=[3,8]$, the traversal outputs five result vertices with corresponding reachability intervals. For example, vertex F is reachable via A ↝ B ↝ F with reachability interval $I_{min}=[2,6]\cap[4,5]$ and $I_{min}\cap Q\neq\emptyset$.

FIG. 9 is a diagram 900 illustrating a listing for implementing a script for computing betweenness centrality in TraveL, having one or more elements consistent with the current subject matter.

FIG. 10 is a diagram 1000 illustrating a listing for traversing the shortest path from vertex to another vertex, having one or more elements consistent with the current subject matter.

Figure 11:
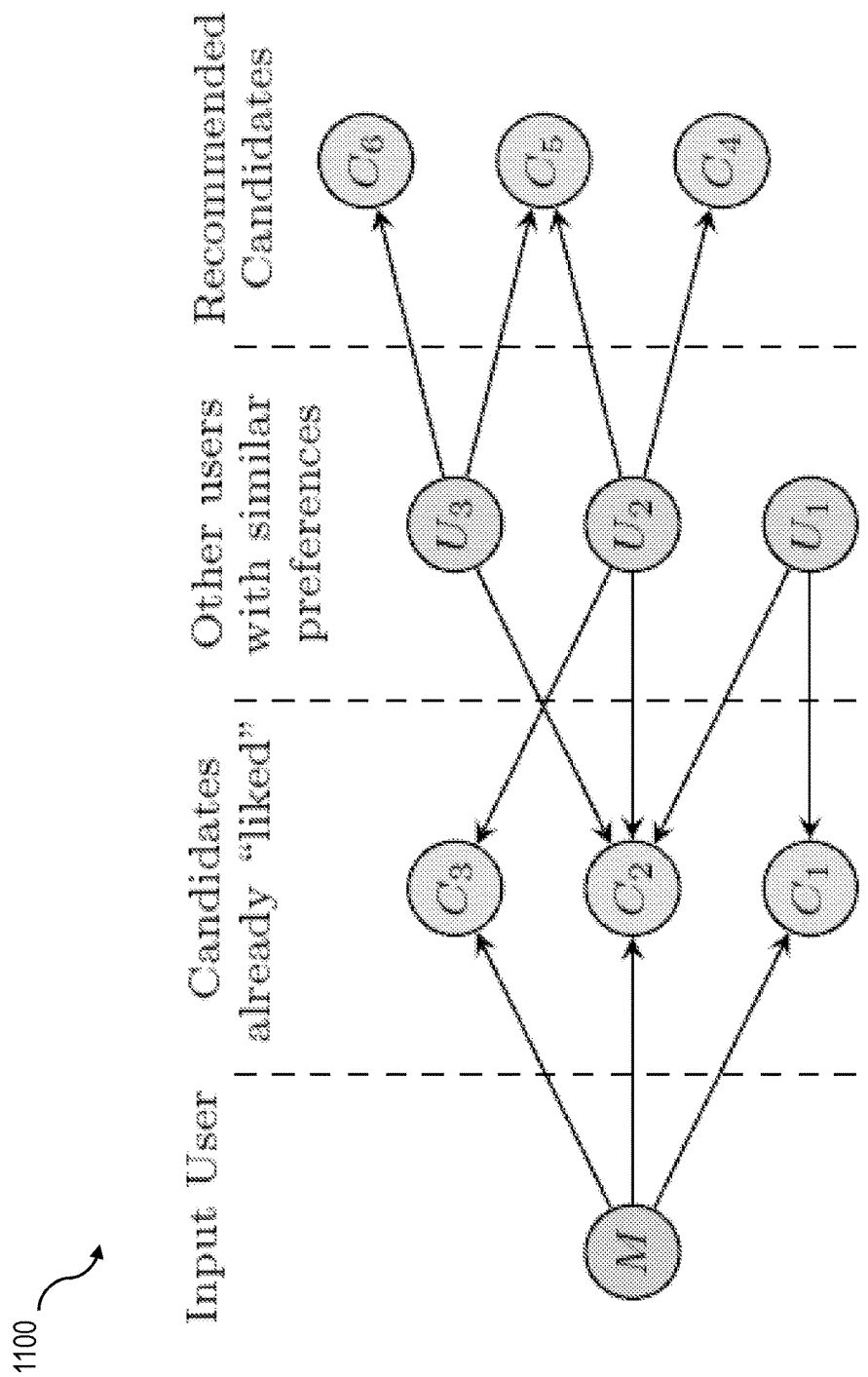
FIG. 11 is a diagram illustrating collaborative filtering item-based recommendation using similar user preferences, having one or more elements consistent with the current subject matter.

Recommendation engines play an important role in e-commerce systems and online dating websites. Based on the preferences of each user, a recommendation engine makes suggestions to the user based on similar preferences by other users. In the following, it is demonstrated how a simple collaborative filtering can be implemented for an online dating website in TraveL. FIG. 11 depicts an example graph 1200 modeling users as vertices and relationships between users as likes (the likes being edges between the vertices). In detail, it is desired to make recommendations for a single user based on his own likes and similar likes of other users. A list of potential matches are returned that are ordered by relevance and those matches that have been already liked are excluded.

FIG. 13 is an illustration of a Listing 1300 that shows an implementation of an item-based collaborative filtering for an online dating website. A transient vertex attribute pop can be used to rank the candidate matches and only return the most relevant ones. Initially, the user of interest can be identified in the TraveL clause, followed by a traversal to retrieve its initial candidate selection ($liked). Next, other users can be retrieved that also liked the same candidates and also register a traversal hook "RECOMMEND" with it. For each user with a similar preference, all his likes can be iterated overt and an internal counter can be updated to quantify the relevance. Finally, the ten most relevant matching candidates can be returned that are ordered ranked by the attribute pop.

The scheduling of activities in complex projects can be formulated as a graph problem and is usually referred to as critical path analysis. The task is to find all critical paths in the graph, i.e., the paths that determine the total project duration. A project schedule with activities and their relationships (dependencies) can be modeled as an activity graph where each activity is modeled as a vertex and each dependency between two activities A and B is modeled as an edge. Each edge has an assigned attribute weight describing the duration it takes to complete activity A, before activity B can be started.

Figure 14:
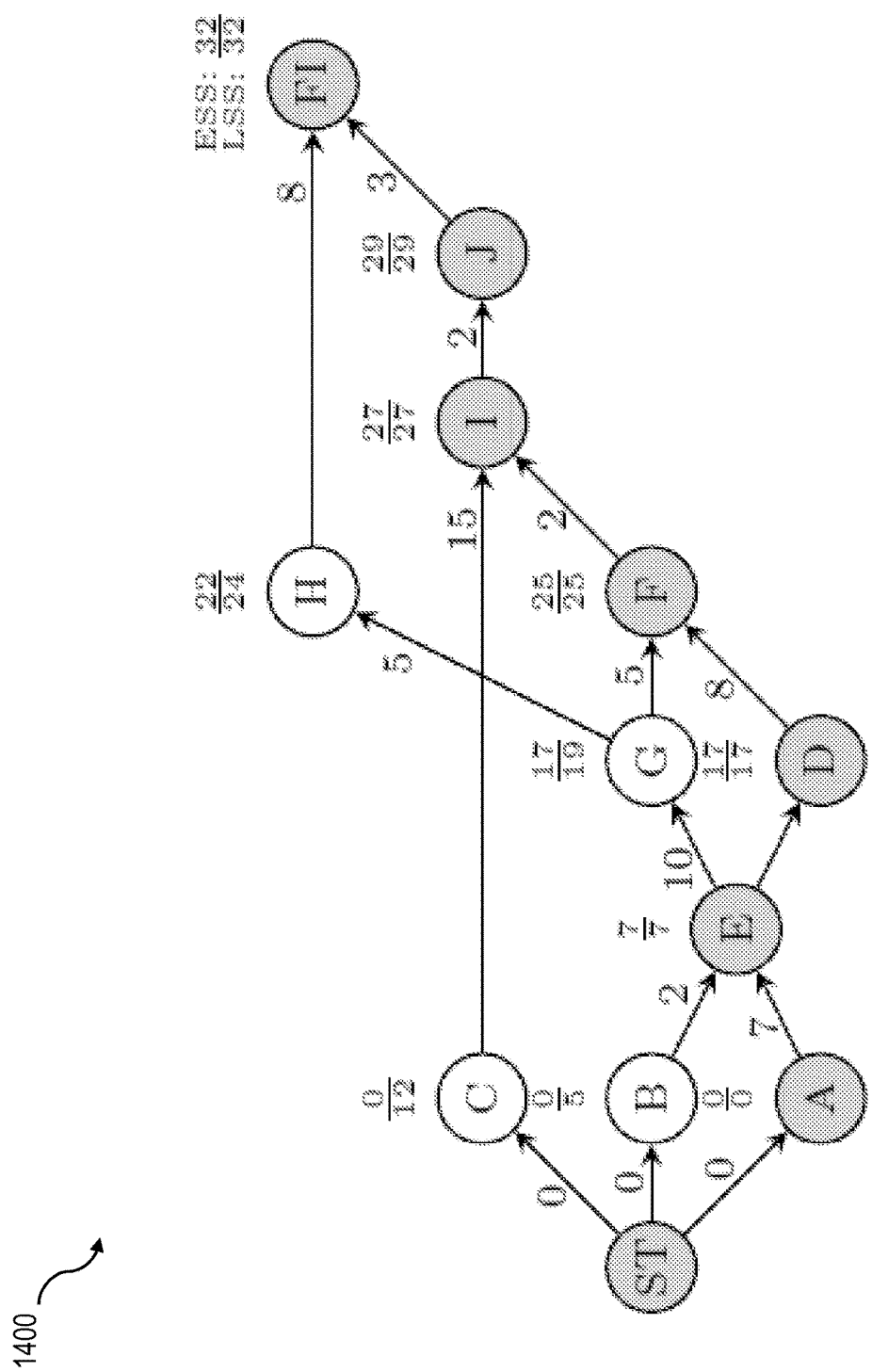
FIG. 14 is a diagram illustrating an activity graph with edge weights as activity durations, ST as initial activity, and FI as final activity with the critical path being shaded; and, FIG. 15 is an illustration of a process for traversing graph data in accordance with one or more elements of the current subject matter.

FIG. 14 shows an example graph 1400 with activities A to FI and an initial activity ST. The start activity is an artificial activity, which is used to form a single root activity (in the case of multiple initial activities). To compute the critical path, the earliest start schedule (ESS) can be determined for each activity using forward calculations of the earliest finish schedule of its predecessors. The earliest finish schedule can be computed as the sum of the earliest start schedule and the duration. If there is more than one predecessor, the new earliest start schedule is the maximum of the earliest finish schedules of its predecessors. For example, the earliest start schedule for activity E is 7.

The second step computes the latest start schedule (LSS) of each activity using backward calculations starting from the final activity FI.

The latest start schedule can be computed as the minimum of all its predecessor activities. The latest start schedule of an activity is defined as the latest finish schedule decreased by the duration. For example, the latest start schedule of activity G is 19.

The final step traverses the graph and collects all activities that have equal earliest/latest start schedules. Each activity that has identical earliest/latest start schedules is defined to be on a critical path. For example, the graph in FIG. 10 has a critical path S ↝ A ↝ E ↝ D ↝ F ↝ I ↝ J ↝ FI For the sake of simplicity, it can be assumed that there can be only one single critical path. The vertices can be collected by forming the critical path in a list structure myRes and use two transient vertex attributes earliest and latest to collect the ESS and LSS, respectively. Three different traversal hooks can be used to implement the three steps of the critical path analysis. The first step computes the earliest start schedules for each activity and stores the results in the transient vertex attribute earliest (lines 12-21). The second step computes the latest start schedules for each activity and stores the result in the transient vertex attribute latest (lines 23-32). The final step extracts all activities, where its earliest start schedule and latest start schedule are the same into the final output structure myRes (lines 34-37). The TRAVERSE clause contains setup code and triggers the execution of three traversals, one for each step and with a different traversal hook registered (lines 39-45).

Figure 15:
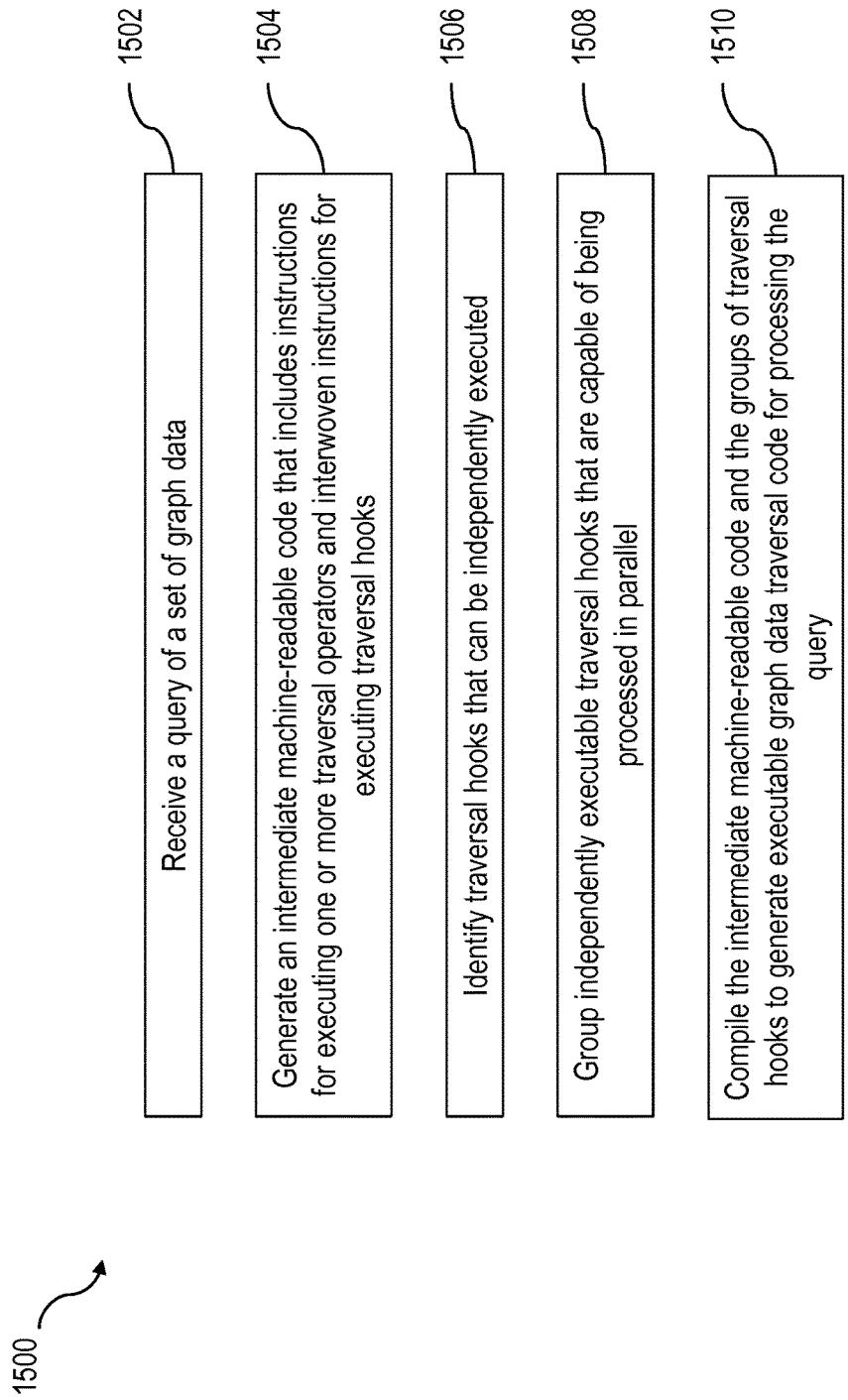

FIG. 15 is an illustration of a process 1500 for performing a query of a set of graph data using traversal codes having one or more elements consistent with the current subject matter. At 1502 a query of a set of graph data can be received. The query can include one or more conditions for assessing the set of graph data that causes the graph data to be traversed, the set of graph data including a plurality of vertices and a plurality of edges between pairs of vertices.

At 1504 an intermediate machine-readable code can be generated. The intermediate machine-readable code can include instructions for executing one or more traversal operators for traversing the set of graph data and which includes interwoven instructions for executing one or more traversal hooks.

At 1506 traversal hooks can be identified that can be independently executed. At 1508 the independently executable traversal hooks that are capable of being processed in parallel can be grouped for parallel processing.

At 1510 the intermediate machine-readable code and the groups of traversal hooks can be compiled to generate executable graph data traversal code for use during the processing of the query.

In some variations, the traversal hooks can be event-based. The traversal hooks can include traversal operators configured to visit vertices and edges of the graph data in an ordered manner. The traversal hooks can be event-based and can comprise traversal operators configured to identify a vertex and/or edge that has previously been visited during processing of the query.

In some variations, a traversal event associated with a traversal hook can be detected. Executable graph data traversal code can be identified that is associated with the traversal hook. The identified executable graph traversal code can be executed. A traversal event can include the identification of a vertex and/or edge of the graph data having a core-defined status during a traversal of the graph data. The groups of traversal hooks can be complied by a just-in-time compiler.

In some variations, the traversal script can include a user-defined output. The script can include an instruction to abandon a traversal of the graph data in response to the occurrence of a predefined condition.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by at least one programmable processor forming at least one computing device, the method comprising:
   receiving, by the at least one programmable processor, a query of a set of graph data, the query including one or more conditions for assessing the set of graph data that causes the graph data to be traversed, the set of graph data including a plurality of vertices and a plurality of edges between pairs of vertices;
   generating, by the at least one programmable processor, an intermediate machine-readable code that includes instructions for executing one or more traversal operators for traversing the set of graph data and which includes interwoven instructions for executing one or more traversal hooks, the generating comprising interweaving an in memory (LLVM) intermediate representation (LLVM IR) of the one or more traversal operators with generated code of the one or more traversal hooks;
   extracting, by the at least one programmable processor, a filter predicate from the one or more traversal hooks;
   preprocessing, by the at least one programmable processor, the filter predicate separately from the one or more traversal hooks;
   identifying, by the at least one programmable processor, traversal hooks of the one or more of traversal hooks that can be independently executed;
   grouping, by the at least one programmable processor, independently executable traversal hooks that are capable of being processed in parallel; and
   compiling, by the at least one programmable processor, the intermediate machine-readable code and the groups of traversal hooks to generate executable graph data traversal code for use during processing of the query.

2. The method as in claim 1, wherein the traversal hooks are event-based and comprise traversal operators configured to visit vertices and edges of the graph data in an ordered manner.

3. The method as in claim 1, wherein the traversal hooks are event-based and comprise traversal operators configured to identify a vertex and/or edge that has previously been visited during processing of the query.

4. The method as in claim 1, further comprising:
   detecting, by the at least one programmable processor, a traversal event associated with a traversal hook;
   identifying, by the at least one programmable processor, executable graph data traversal code that is associated with the traversal hook which in turn is associated with the traversal hook; and
   executing, by the at least one programmable processor, the executable graph data traversal code associated with the traversal hook.

5. The method as in claim 4, wherein a traversal event includes the identification of a vertex and/or edge of the graph data having a core-defined status during a traversal of the graph data.

6. The method as in claim 1, wherein compiling the groups of traversal hooks is performed by a just-in-time compiler.

7. The method as in claim 1, wherein the traversal script includes a user-defined output.

8. The method as in claim 1, wherein the traversal script includes an instruction to abandon a traversal of the graph data in response to the occurrence of a restriction condition.

9. A system comprising at least one programmable processor forming at least one computing device, the at least one programmable processor configured by machine readable instructions to perform operations comprising:
   receiving a query of a set of graph data, the query including one or more conditions for assessing the set of graph data that causes the graph data to be traversed, the set of graph data including a plurality of vertices and a plurality of edges between pairs of vertices;
   generating an intermediate machine-readable code that includes instructions for executing one or more traversal operators for traversing the set of graph data and which includes interwoven instructions for executing one or more traversal hooks, the generating comprising interweaving an in memory (LLVM) intermediate representation (LLVM IR) of the one or more traversal operators with generated code of the one or more traversal hooks;
   extracting a filter predicate from the one or more traversal hooks;
   preprocessing the filter predicate separately from the one or more traversal hooks;
   identifying traversal hooks of the one or more of traversal hooks that can be independently executed;
   grouping independently executable traversal hooks that are capable of being processed in parallel; and
   compiling the intermediate machine-readable code and the groups of traversal hooks to generate executable graph data traversal code for use during processing of the query.

10. The system as in claim 9, wherein the traversal hooks are event-based and comprise traversal operators configured to visit vertices and edges of the graph data in an ordered manner.

11. The system as in claim 9, wherein the traversal hooks are event-based and comprise traversal operators configured to identify a vertex and/or edge that has previously been visited during processing of the query.

12. The system as in claim 9, wherein the operations comprise:
   detecting a traversal event associated with a traversal hook;

identifying executable graph data traversal code that is associated with the traversal hook which in turn is associated with the traversal hook; and executing the executable graph data traversal code associated with the traversal hook.

13. The system as in claim 12, wherein a traversal event includes the identification of a vertex and/or edge of the graph data having a core-defined status during a traversal of the graph data.

14. The system as in claim 9, wherein compiling the groups of traversal hooks is performed by a just-in-time compiler.

15. The system as in claim 9, wherein the traversal script includes a user-defined output.

16. The system as in claim 9, wherein the traversal script includes an instruction to abandon a traversal of the graph data in response to the occurrence of a restriction condition.

17. A non-transitory computer program product storing instructions which, when executed by at least one data processor forming part of at least one computing device, result in operations comprising:

receiving, by the at least one programmable processor, a query of a set of graph data, the query including one or more conditions for assessing the set of graph data that causes the graph data to be traversed, the set of graph data including a plurality of vertices and a plurality of edges between pairs of vertices;

generating, by the at least one programmable processor, an intermediate machine-readable code that includes instructions for executing one or more traversal operators for traversing the set of graph data and which includes interwoven instructions for executing one or more traversal hooks, the generating comprising interweaving an in memory (LLVM) intermediate representation (LLVM IR) of the one or more traversal operators with generated code of the one or more traversal hooks;

extracting, by the at least one programmable processor, a filter predicate from the one or more traversal hooks;

preprocessing, by the at least one programmable processor, the filter predicate separately from the one or more traversal hooks;

identifying, by the at least one programmable processor, traversal hooks of the one or more of traversal hooks that can be independently executed;

grouping, by the at least one programmable processor, independently executable traversal hooks that are capable of being processed in parallel; and compiling, by the at least one programmable processor, the intermediate machine-readable code and the groups of traversal hooks to generate executable graph data traversal code for use during processing of the query.

18. The non-transitory computer program product as in claim 17, wherein the traversal hooks are event-based and comprise traversal operators configured to visit vertices and edges of the graph data in an ordered manner.

19. The non-transitory computer program product as in claim 17, wherein the traversal hooks are event-based and comprise traversal operators configured to identify a vertex and/or edge that has previously been visited during processing of the query.

20. The non-transitory computer program product as in claim 17, wherein the operations further comprise:

detecting, by the at least one programmable processor, a traversal event associated with a traversal hook;

identifying, by the at least one programmable processor, executable graph data traversal code that is associated with the traversal hook which in turn is associated with the traversal hook; and executing, by the at least one programmable processor, the executable graph data traversal code associated with the traversal hook.

* * * * *